Jan. 8, 1952   W. A. SCHLEGEL ET AL   2,581,888
AUTOMOBILE SEAT COVER
Filed Feb. 3, 1948

William A. Schlegel
Richard J. Schlegel   INVENTORS.
BY
Attorneys

UNITED STATES PATENT OFFICE 2,581,888

AUTOMOBILE SEAT COVER

William A. Schlegel, Napoleon, and Richard J. Schlegel, Defiance, Ohio

Application February 3, 1948, Serial No. 6,056

1 Claim. (Cl. 155—182)

This invention relates to new and useful improvements and structural refinements in covers for automobile seats, and the principal object of the invention is to prevent soiling of the seat upholstery, particularly by persons who, upon completion of their daily work, wear soiled clothes while returning home in the automobile.

This object is achieved by the provision of a seat cover or covers on which such persons may sit without coming in contact with the seat upholstery.

An important feature of the invention resides in the provision of a seat cover which may be quickly and easily applied to the seat and which may be removed therefrom with equal expediency when it is not required.

Another feature of the invention resides in the provision of a seat cover which is simple in construction, which may be easily cleaned or laundered, and which will readily lend itself to economical manufacture.

Figure 1:
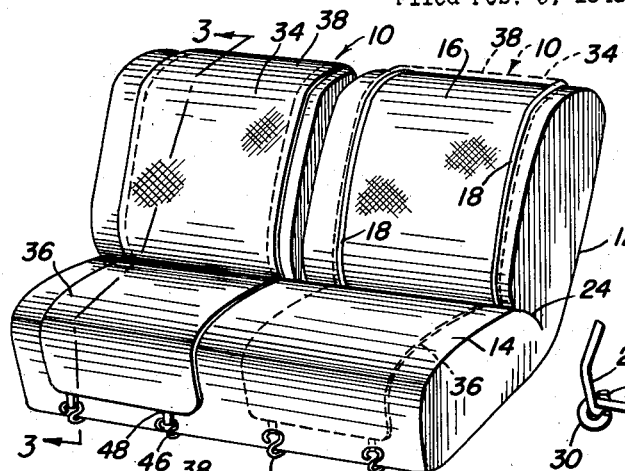
Figure 2:
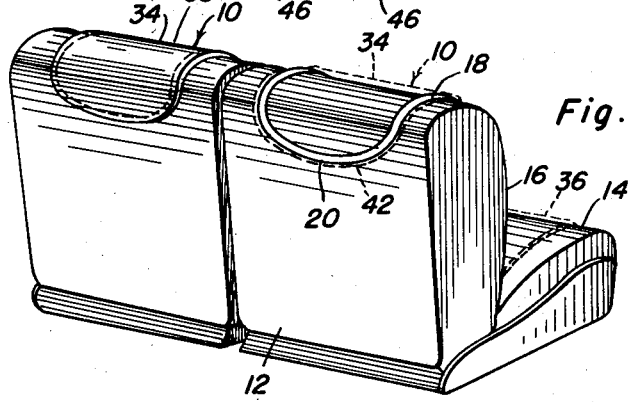
Figure 4:
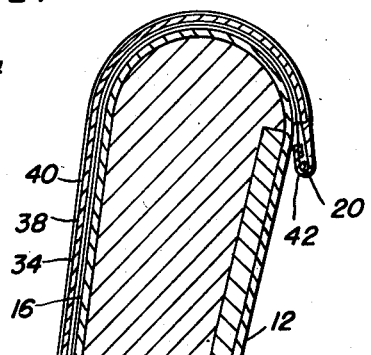
Figure 3:
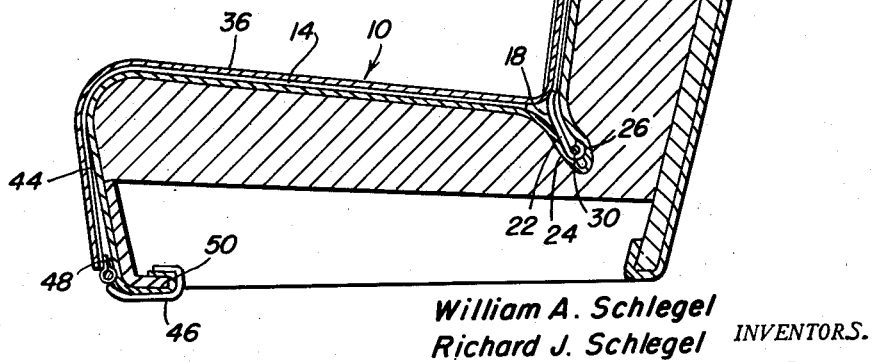

With the above more important objects and features in view, and such other objects as may become apparent as this specification proceeds, the invention consists essentially of the arrangement and construction of parts as illustrated in the accompanying drawings, in which:

Figure 1 is a front perspective view of an automobile seat showing the invention associated therewith, Figure 2 is a rear perspective view of the subject shown in Figure 1, Figure 3 is a cross sectional view, taken substantially in the plane of the line 3—3 in Figure 1, and Figure 4 is a fragmentary perspective view of a frame used in the invention.

Like characters of reference are employed to designate like parts in the specification and throughout the several views.

Referring now to the accompanying drawings in detail, the invention consists of an automobile seat cover designated generally by the reference character 10, one or more of which may be used in association with a seat 12 of any conventional type.

The seat 12 usually includes in its construction a seat cushion 14 and a back cushion 16, the latter either extending the full width of the seat, or alternatively, being formed in two sections, as illustrated in the accompanying drawings.

The seat cover 10 embodies in its construction a frame 18, preferably formed from wire rods, this frame having a substantially U-shaped configuration and being intended for positioning upon the back cushion 16.

As is best shown in Figure 2, the closed upper end portion 20 of the frame is arcuated so that it extends over and behind the upper edge portion of the back cushion 16, while the free end portions 22 of the frame are angulated and are insertable in a crevice 24 which usually exists at the junction of the back cushion 16 with the seat cushion 14.

The angulated portions 22 of the frame 18 terminate in a pair of hooks 26, and a rod 28, equipped at one end thereof with an eye 30, is movably connected thereby to one of these hooks, while the remaining end portion of the rod, preferably provided with a finger piece 32, is engageable with the second hook (26), as is best shown in Figure 4. A sheet 34 of flexible material such as fabric, or the like, is of an elongated configuration and provides what will be hereinafter referred to as a seat covering portion 36 and a back covering portion 38.

The back covering portion 38 of the sheet 34 is formed at the longitudinal edges thereof with suitable hems 40 which slidably receive the side portions of the frame 18, while the upper end of the sheet portion 38 provides a pocket 42 to removably receive the portion 20 of the frame 18, as indicated in Figures 2 and 3.

The seat covering portion 36 of the sheet 34 extends forwardly on the seat cushion 14 and downwardly along the forward edge portion 44 of the seat cushion, being provided at its lower edge with a plurality of hook-shaped fasteners 46 which are resiliently secured thereto by means of elastic bands 48. It is to be noted that the hook-shaped fasteners 46 are engageable with the framework 50 of the seat, as will be clearly apparent from the accompanying Figure 3.

When the invention is placed in use, the frame 18, together with the sheet portion 38, is applied to the back cushion 16 as has been already described, while the sheet portion 36 is placed upon the seat cushion 14 and the fasteners 46 are engaged with the seat framework 50, whereby the entire cover will be firmly secured to the seat. It is to be noted in this connection that the rod 28 will retain the side portions of the frame 18 in a predetermined, spaced relation, and the angulated portions 22 of the framework 18, by virtue of their engagement with the crevice 24, will prevent the seat cover from lifting upwardly or outwardly, and the sheet 34, as a whole, will be tightly stretched on the seat and wrinkling thereof will be effectively prevented.

Needless to say, the seat cover may be removed from the seat by simply reversing the procedure of its application, as above decribed.

Admittedly, various types of covers for automobile seats have been made, but these covers are usually intended to envelop the entire seat, so that the application and removal thereof is not a simple task. Moreover, if such covers are to fit the seat properly, they must be designed especially for the particular seats for which they are intended, and interchangeability thereof from one seat to another is obviously impossible. However, the seat cover constructed in accordance with the teachings of this invention may be readily applied to seats of various sizes and types, particularly in view of the resiliently mounted fasteners 46, which may be engaged with the framework (50) of the seat by simply stretching the bands or straps 48.

The sheet of material 34 may be cleaned or laundered as frequently as desired, this being facilitated by simply removing the entire cover 10 from the seat 12 and thereafter disengaging the rod 28 from one of the hooks 26. The portion 20 of the frame 18 may then be removed from the pocket 42 and the side portions of the frame withdrawn from the hem 40, so that the sheet 34 may be cleaned or laundered in the absence of the metallic frame 18.

It is believed that the advantages and use of the invention will be clearly apparent from the foregoing disclosure, and accordingly, further description thereof at this point is deemed unnecessary.

Having described the invention, what is claimed as new is:

In a seat cover, the combination of a sheet provided at one end thereof with a pocket and having a pair of open ended hems extended at longitudinal edges of the sheet from said pocket, a substantially U-shaped frame affording a bight portion disposed in said pocket and a pair of side members extending through the respective hems, free end portions of said side members projecting from said hems and each terminating in a hook, and a crossbar extending transversely of said sheet and provided at one end thereof with an eye connected to the hook of one of said side members, the remaining end portion of said bar being engageable with the hook of the second side member, and a finger piece provided on said remaining end portion of the crossbar.

WILLIAM A. SCHLEGEL.
RICHARD J. SCHLEGEL.

REFERENCES CITED

The following references are of record in the file of this patent:

UNITED STATES PATENTS

| Number | Name | Date |
|---|---|---|
| 1,777,451 | Sallop | Oct. 7, 1930 |
| 1,833,797 | Seely | Nov. 24, 1931 |
| 1,999,560 | Brueckl | Apr. 30, 1935 |
| 2,040,463 | Brueckl | May 12, 1936 |